United States Patent [19]
Kobayashi et al.

[11] Patent Number: 5,177,751
[45] Date of Patent: Jan. 5, 1993

[54] LASER APPARATUS

[75] Inventors: Kuniaki Kobayashi; Seiji Sugiyama; Yoshikazu Kanai; Tatsuo Tsunoda, all of Tokyo, Japan

[73] Assignee: Leonix Corporation, Tokyo, Japan

[21] Appl. No.: 694,092

[22] Filed: May 1, 1991

[30] Foreign Application Priority Data

May 10, 1990 [JP] Japan .............................. 2-49001[U]
May 10, 1990 [JP] Japan .............................. 2-120369
Oct. 4, 1990 [JP] Japan .............................. 2-267177

[51] Int. Cl.⁵ .............................. H01S 3/10
[52] U.S. Cl. .............................. 372/22; 372/93; 372/105
[58] Field of Search .............. 372/105, 21, 22, 92, 372/99, 93

[56] References Cited

U.S. PATENT DOCUMENTS 3,949,323 4/1976 Bierlein et al. .............. 332/7.51
4,048,515 9/1977 Liu .............................. 372/105
5,056,103 10/1991 Alfrey et al. .................. 372/105

OTHER PUBLICATIONS

Walter Koechner "Solid-State Laser Engineering," Springer Series in Optical Sciences, Springer-Verlag, pp. 504-518.

Primary Examiner—James W. Davie
Attorney, Agent, or Firm—Pollock, VandeSande & Priddy

[57] ABSTRACT

Disclosed is a laser apparatus having an optical pumping source, first and second resonator mirrors, a laser medium provided on a light route between the first and second resonator mirrors, an optical system provided in a light route between the laser medium and the second resonator mirror; and a nonlinear optical crystal for generating through wavelength conversion a higher harmonic wave(s) from a fundamental wave of laser generated by the laser medium. The nonlinear optical crystal is capable of being inserted between the intermediate optical system and the second resonator mirror. The second resonator mirror is a concave mirror. The intermediate optical system is constituted by a single concave mirror reflecting the fundamental wave and transmitting the higher harmonic wave(s). The intermediate optical system may also be constituted by a single plane mirror reflecting the fundamental wave and transmitting the higher harmonic wave(s), and an intermediate concave mirror reflecting light reflected from the plane mirror to the second resonator mirror and reflecting light reflected from the second resonator mirror to the plane mirror, and the nonlinear optical crystal is capable of being inserted between the intermediate concave mirror and second resonator mirror. Cooling structure for an optical pumping source is also disclosed.

7 Claims, 3 Drawing Sheets

FIG. 1

PRIOR ART

LASER APPARATUS

BACKGROUND OF THE INVENTION

1. Field of the Invention

This invention relates to a laser apparatus, in which a nonlinear optical crystal is inserted in a laser resonator for generating a higher harmonic laser beam through wavelength conversion.

Furthermore, this invention relates to a cooling structure for a pumping source lamp of a laser apparatus using a tungsten-halogen lamp as the excitation source lamp.

2. Related Art Statement

It is well known in the art that by causing the fundamental wave of a laser beam to be incident on a nonlinear optical crystal such as KTP ($KTiPO_4$), BBO ($\beta$-$BaB_2O_4$), KDP ($KH_2PO_4$), etc. the same fundamental wave and a higher harmonic wave thereof can be obtained, and that the efficiency of conversion of the fundamental wave to the higher harmonic wave is increased with increasing power density.

As methods of high efficiency wavelength conversion in a continuous oscillation laser making use of the above feature of a nonlinear optical crystal, usually there are one in which the nonlinear optical crystal is inserted in a light route in a resonator, another one in which a bent light route inside a resonator is formed such that a laser beam is reciprocally incident on the nonlinear optical crystal, and yet another one in which a laser beam is converged in the nonlinear optical crystal by using a lens.

In the case of inserting the nonlinear optical crystal in the light route in the resonator or in the case of providing the bent light route in the resonator to permit reciprocal incidence of the laser beam on the nonlinear optical crystal, the conversion efficiency is low, resulting in too large of a power difference between the laser beam input to the crystal and the higher harmonic wave, for example, as a double frequency output.

Figure 1:
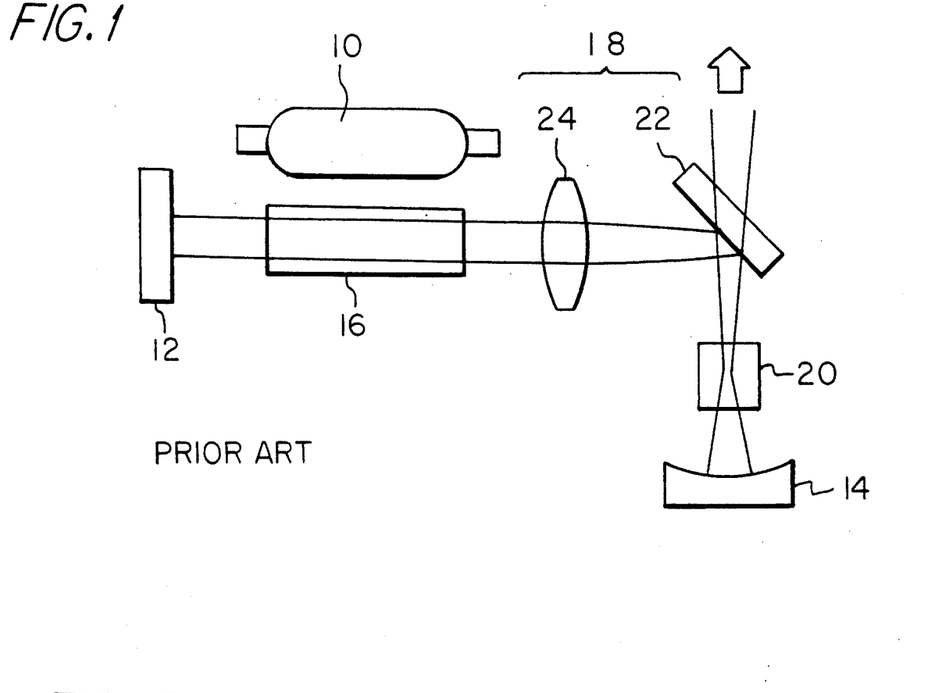
FIG. 1 is a schematic view for explaining a prior art laser apparatus.

In the case of converging the laser beam by providing a lens in the nonlinear optical system, an arrangement as shown in FIG. 1 is used. The arrangement comprises an optical pumping source or an excitation source 10, first and second resonator mirrors 12 and 14, laser medium 16 provided in a light route between the first and second resonator mirrors, intermediate optical system 18 provided in a light route between the laser medium and second resonator mirror and nonlinear optical crystal 20 provided between the intermediate optical system and second resonator mirror. The nonlinear optical crystal converts the fundamental wave of a laser beam generated by laser medium 16 to generate a higher harmonic wave such, for example, as a double frequency wave. In this laser apparatus, the second resonator mirror 14 is a concave mirror, and intermediate optical system 18 includes a single plane mirror 22 reflecting the fundamental wave and transmitting the higher harmonic wave and a converging lens 24 provided in a light route between the laser medium 16 and the plane mirror 22. The laser beam is adapted to be converged in the nonlinear optical crystal 20 inserted between the plane mirror 22 and the second resonator mirror 14.

In the method using a converging lens as above, however, the converging lens is inserted in a light route in resonator. Therefore, the laser beam is subject to a great amount of loss of light such as that due to reflection at the front and back surfaces of the converging lens and also that due to transmission and absorption by the lens. Thus, the power density of the fundamental wave of laser beam to be incident on the crystal is not increased as expected but is increased very slightly or rather reduced, resulting in slight increase or rather reduction of the double frequency output from the crystal. This tendency is particularly pronounced in low gain, low output laser apparatuses.

In another aspect, since the laser beam is provided from the plane surface mirror constituting intermediate optical system 18, the laser beam converged by concave surface mirror 14 becomes divergent after passing through the crystal. This means that the output laser beam is a divergent beam. Therefore, where a parallel laser beam is necessary, a special optical system has to be provided for obtaining a parallel beam from the output beam.

Heretofore, as a light source for pumping or exciting a laser medium of a laser apparatus, a crypton arc lamp and a tungsten-halogen lamp (also called halogen lamp) are used.

The crypton arc lamp uses a high voltage for discharge and therefore requires a large-scale power source, and also the input is several 10 A with AC 200 V. Thus, it is rather expensive for using it for a laser apparatus.

The halogen lamp, on the other hand, has a structure with halogen gas sealed together with tungsten filaments in a glass bulb, and it is used for general illumination purposes. It can be used with AC 100 V. Therefore, where there is no problem concerning the stability of laser output, there is no need of providing any special power source. In addition, the lamp is small in size and inexpensive. Thus, it can be used as an excitation source of a laser apparatus.

A halogen lamp used as an excitation source of the laser apparatus is an elongate lamp and is usually of a double end type. The lamp bulb has a shield section provided at each end. The shield section has a flatly squeezed shape. In the bulb, inner leads connected to tungsten filaments, molybdenum coils and external lead rods are connected to one another.

However, where the lamp is used with high power, the temperature is liable to be excessively high, and the lamp is desired to be air cooled. However, where the lamp is used for laser excitation, it is disposed in a reflector formed in a laser medium holder block such that it faces a laser medium. For this reason, it can not be air cooled due to the structure of the laser apparatus, and presently it is used without air cooling.

Although the halogen lamp has advantageous features, a practical high output laser beam can not be obtained by using a halogen lamp excitation laser apparatus for the problem of excessive heating of the lamp in practice has not been solved. If there is no problem of excessive heating of the halogen lamp even when the lamp is used with high power for a long time, it is possible to actually use a laser apparatus which makes use of features of the halogen lamp excitation.

From surveys of the phenomenon of deterioration of the halogen lamp, it is revealed that in usual use of the lamp without cooling the whole lamp is elevated in temperature, and the lamp seal portion temperature is raised to be as high as about 500° C.

The seal portion of the lamp uses molybdenum foil as noted above, and the increase of the temperature to be as high as noted above will cause rupture of the foil or reduce life thereof. This character is illustrated in FIG. 5.

Figure 5:
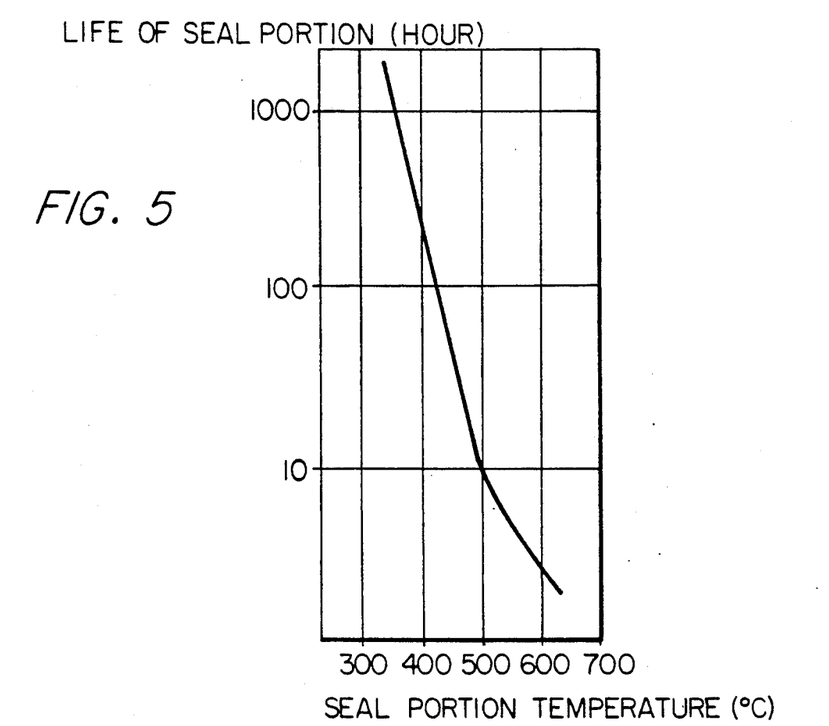
FIG. 5 is a graph showing a relation between the life of the seal portion of a lamp and the temperature of the seal portion.

FIG. 5 is a graph showing the relation between the life of the sealed portion of the halogen lamp (for which the ordinate is taken as time axis) and seal portion temperature of the lamp (for which the abscissa is taken as °C. axis).

As will be understood from this characteristic curve, when the temperature is as high as about 500° C., the life of the shield portion is as short as about 10 hours.

For this reason, heretofore only low power halogen lamps are used, and thus only low output can be obtained as laser output.

SUMMARY OF THE INVENTION

The present invention has been intended in the light of the above problems inherent in the prior art. Accordingly, a first object of the present invention is to provide a laser apparatus, which permits high efficiency of wavelength conversion to be attained without use of any converging lens, which will lead to laser beam light intensity loss, thus permitting high double frequency laser beam output to be obtained.

A second object of the present invention is to provide a laser apparatus, which can provide a parallel laser beam in addition to attaining the first object.

A third object of the present invention is to provide a laser apparatus, which permits control of the spread angle of the output laser beam and also permits control of the beam waist.

A fourth object of the present invention is to provide a lamp cooling structure, which permits use of a high power halogen lamp as an pumping source of a laser apparatus.

To attain the above first to third objects of the present invention, there is provided a first structure of laser apparatus comprising: an optical pumping source, first and second resonator mirror, a laser medium provided on a light route (or light path or laser beam path) between the first and second resonator mirrors, an intermediate optical system provided in a light route between the laser medium and the second resonator mirror; and a nonlinear optical crystal for generating through wavelength conversion a higher harmonic wave(s) from a fundamental wave of laser generated by the laser medium; wherein the nonlinear optical crystal is capable of being inserted between the intermediate optical system and the second resonator mirror, wherein the second resonator mirror is a concave mirror; and wherein the intermediate optical system is constituted by a single concave mirror reflecting the fundamental wave and transmitting the higher harmonic wave(s).

With this structure, the nonlinear optical crystal can be inserted between two concave mirrors to permit reciprocation of the laser beam any number of times through the crystal. In addition, the laser beam can be effectively converged in the crystal without provision of any converging lens or like element giving rise to losses due to reflection at the two, i.e., front and back, surfaces and also losses due to transmission and absorption but with the two concave mirrors. Thus, it is possible to provide a higher harmonic wave such, for example, as a double frequency laser beam with high power compared to the prior art from a concave mirror constituting the intermediate optical system.

According to the present invention, there is also provided a second structure of laser apparatus comprising: an optical pumping source, first and second resonator mirrors, a laser medium provided on a light route between the first and second resonator mirrors, an intermediate optical system provided in a light route (or light path or laser beam path) between the laser medium and the second resonator mirror, and a nonlinear optical crystal for generating through wavelength conversion a higher harmonic wave(s) from a fundamental wave of laser generated by the laser medium; wherein the nonlinear optical crystal is capable of being inserted between the intermediate optical system and the second resonator mirror being a concave surface mirror, wherein the intermediate optical system is constituted by a single plane mirror reflecting the fundamental wave and transmitting the higher harmonic wave(s), and an intermediate concave mirror reflecting light reflected from the plane mirror to the second resonator mirror and reflecting light reflected from the second resonator mirror to the plane mirror, and wherein the nonlinear optical crystal is capable of being inserted between the intermediate concave mirror and second resonator mirror.

With this second structure, in addition to permitting reciprocation of the laser beam any number of times through the nonlinear optical crystal inserted between two concave mirrors, one being the intermediate concave mirror and the other being second resonator mirror, the laser beam can be effectively converged in the crystal without provision of any converging lens or like element giving rise to losses due to reflection at two, i.e., front and back, surfaces and also losses due to transmission and absorption but with the two concave mirrors, thus permitting a double frequency laser beam to be provided with high power compared to the prior art from a concave surface mirror constituting the intermediate optical system.

Further, the two concave mirrors and plane mirror can be arranged in such a relation to one another that the laser beam reflected from the intermediate concave mirror to the plane surface mirror is a parallel beam, and thus it is possible to provide a parallel laser beam from the plane mirror.

In a preferred example of the second structure according to the invention, the second resonator mirror is capable of position control along the optical axis of the laser apparatus. With this structure, the second resonator mirror can be displaced along the optical axis between it and the intermediate concave mirror, and thus it is possible to set the spread angle of the laser beam output from the intermediate plane surface mirror according to the design. In this case, a crystal support mechanism may be constructed such that the nonlinear optical crystal inserted between the two concave mirrors is capable of position control for permitting convergence of the laser beam in the crystal.

In the above first and second structures of laser apparatus, the dimensions and disposition of the constituent elements of the laser apparatus are suitably set to meet the following conditions.

In the first structure of laser apparatus, $0.5 \times (L_2+L_3+L_4) \leq L_1 \leq 1.5 \times (L_2+L_3+L_4)$, where $L_1$ is a distance between the first resonator mirror and laser medium, $L_2$ is a distance between the concave mirror of the intermediate optical system and laser medium, $L_3$ is a distance between the concave surface mirror of the intermediate optical system and laser beam convergence position (i.e., beam waist) in the nonlinear optical crystal, and $L_4$ is a distance between the concave surface mirror as the second resonator mirror and laser beam convergence position (i.e., beam waist) in the nonlinear optical crystal.

In the second structure of laser apparatus, $0.5 \times (L_3+L_4+L_5+L_6) \leq L_1 \leq 1.5 \times (L_3+L_4+L_5+L_6)$, where $L_1$ is a distance between the first resonator mirror and the laser medium, $L_3$ is a distance between the concave mirror of the intermediate optical system and laser beam convergence position (i.e., beam waist) in the nonlinear optical crystal, $L_4$ is a distance between the concave mirror as the second optical system and laser beam convergence position (i.e., beam waist) in the nonlinear optical crystal, $L_5$ is a distance between the plane surface mirror of the intermediate optical system and the laser medium, and $L_6$ is a distance between the plane mirror of the intermediate optical system and intermediate concave mirror thereof.

By setting the value of distance $L_1$ between the first resonator mirror and laser medium under the above conditions in the first and second structures of laser apparatus, the shape of the beam in the resonator is such as to make effective use of the section of the laser medium, and it is thus possible to make the laser output maximum. If $L_1$ is deviated from the above conditions, the laser output is extremely reduced or, in an extreme case, the oscillation is stopped.

Further, in the first and second structures of laser apparatus, preferably $$0.3 \times R_2 \leq L_3 \leq 0.7 \times R_2, \text{ and}$$

$$0.8 \times R_3 \leq L_4 \leq 1.2 \times R_3;$$

where $L_3$ is a distance between the concave mirror of the intermediate optical system and laser beam convergence position (i.e., beam waist) in the nonlinear optical system, $L_4$ is a distance between concave mirror of the second resonator mirror and laser beam convergence position (i.e., beam waist) in the nonlinear optical crystal, $R_2$ is a radius of curvature of the concave surface mirror of the intermediate optical system in the first structure, or radius of curvature of the intermediate concave surface mirror in the intermediate optical system in the second structure, and $R_3$ is a radius of curvature of the concave surface mirror as the second resonator mirror.

By setting the values of $L_3$ and $L_4$ under the above-mentioned conditions, it is possible to converge a laser beam to a very small spot in the nonlinear optical crystal. Thus, high efficiency of wavelength conversion can be obtained to obtain high output.

A feature of the present invention for attaining the above fourth object is a cooling structure for a pumping source lamp for pumping or exciting a laser medium constituting a laser apparatus, in which a tungsten-halogen lamp as the pumping source lamp has a seal portion provided with a heat radiation portion.

In carrying out the present invention, the heat radiation portion is suitably provided in contact with a holding block, which is provided with a cooling water path for water cooling a laser medium and holds the laser medium.

The heat radiation portion may be plate-like or fin-like or has any other shape which can provide high heat radiation effect.

With the provision of the heat radiation section in only the seal portion of the lamp, heat is radiated from the seal portion to the heat radiation section and hence to the atmosphere or to the holding block. Thus, only the seal portion can be cooled effectively without reducing the surface temperature of the bulb of the halogen lamp.

Where the heat radiation portion is provided in contact with the holding block which is cooled, the temperature of the seal portion may be lowered to 350° C.

BRIEF DESCRIPTION OF THE DRAWINGS

The foregoing and other objects, features and advantages of the present invention will be better understood from the following description taken in connection with the accompanying drawings, in which.

DESCRIPTION OF THE PREFERRED EMBODIMENTS

Now, preferred embodiments of the invention will be described with reference to the drawings.

The drawings which will be hereinafter referred to, show the shapes, sizes and dispositional relation of constituent elements only schematically such that the invention can be understood. In addition, parts like those described before in connection with FIG. 1 are designated by like reference numerals, and their description is not given hereinunder in general Further, in the following embodiments the laser medium is assumed to be of 1,064-nm YAG laser.

FIRST EMBODIMENT

Figure 2:
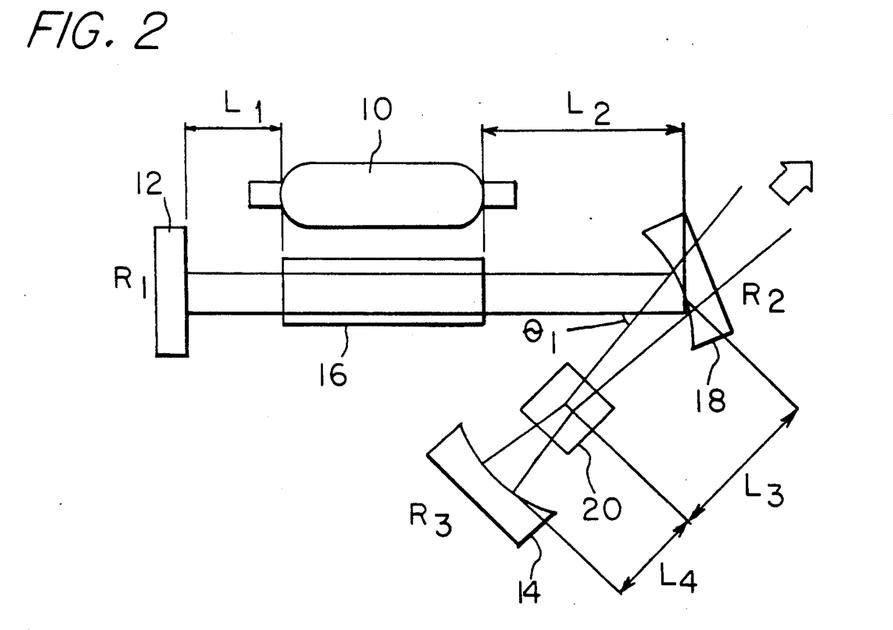
FIG. 2 is a schematic view for explaining a first embodiment of the laser apparatus according to the invention.

FIG. 2 is a view for explaining a first embodiment of the invention.

In this embodiment, a resonator mirror 14 is formed as a concave surface mirror. Also an intermediate optical system 18 is a single concave surface mirror reflecting the fundamental wave and transmitting a higher harmonic wave such as, for example, a double frequency wave. In this case, the light emission surface of the concave mirror 18 is usually suitably planar.

In this structure, a laser beam of fundamental wave generated with pumping or excitation of a laser medium by a pumping source 10, is repeatedly reflected and amplified for laser oscillation between first and second resonator mirrors 12 and 14 via the laser medium 16 and the intermediate concave mirror 18. The mirror 18 serves as a reflector with respect to the fundamental wave laser beam. The fundamental wave laser beam is a parallel beam between the first resonator mirror 12 and intermediate concave mirror 18, but it is converged and then diverged between the intermediate concave surface mirror 18 and the second resonator mirror 14.

Accordingly, a nonlinear optical crystal 20 is inserted at a position of convergence of the laser beam (i.e., beam waist). The insertion of the crystal may be made by using well-known suitable support means.

Every time the fundamental wave laser beam passes through the nonlinear optical crystal 20, the fundamental wave (with a wavelength of 1,064 nm) is wavelength converted, thus generating a secondary harmonic wave, that is, a double frequency laser beam (with a wavelength of 532 nm).

The double frequency laser beam which is generated in this way, is transmitted through the intermediate concave mirror 18 and generated or output or provided as output of the laser apparatus.

In this embodiment, the laser beam reciprocally passes through the nonlinear optical crystal a number of times, and the crystal can be disposed at the beam waist formed by two concave surface mirrors 14 and 18. It is thus possible to increase the power density of the laser beam in the crystal, thus permitting wavelength conversion with high efficiency. Besides, no optical system is used, which is subject to great insertion loss like a lens.

Assuming the double frequency laser beam output of the prior art laser shown in FIG. 1 using the converging lens (made of synthetic quartz) to be about 0.5 W, with this embodiment of the laser apparatus, in which concave surface mirror 18 (i.e., intermediate optical system) is used instead of plane surface mirror shown in FIG. 1 and in which the converging lens is not used, the double frequency laser beam output can be increased to about 1.5 W, i.e., over about three times Further, the spread angle of the output laser beam in this first embodiment is about 40 mrad.

SECOND EMBODIMENT

Figure 3:
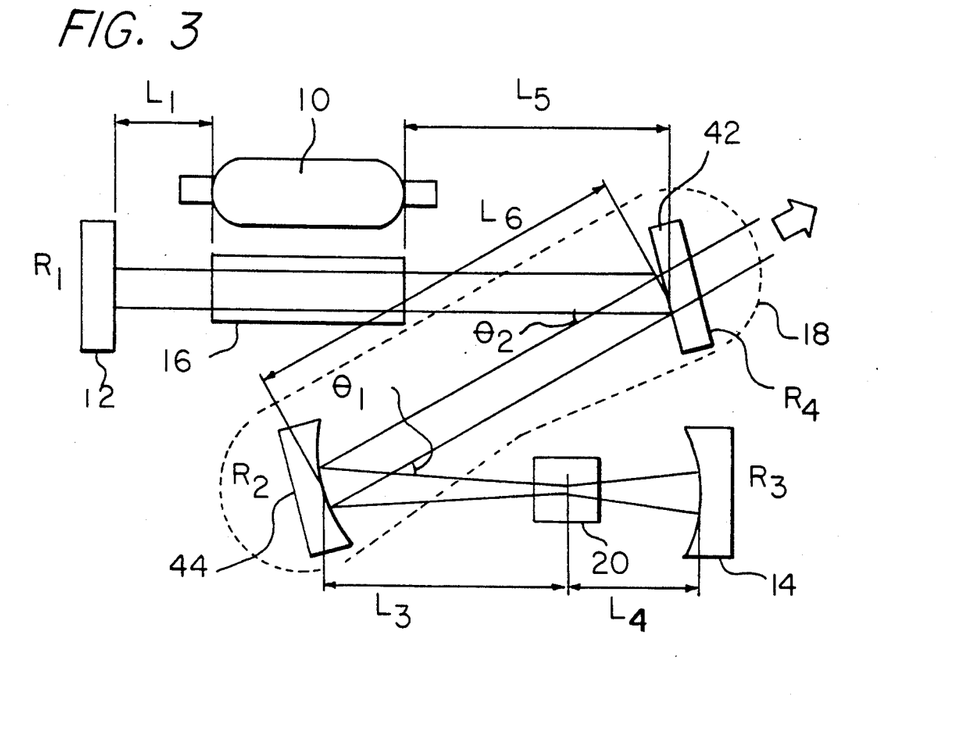
FIG. 3 is a schematic view for explaining a second embodiment of the laser apparatus according to the invention.

Now, a second embodiment of the invention will be described FIG. 3 is a view for explaining the second embodiment of the laser apparatus according to the invention.

In this embodiment, like the first embodiment, a second resonator mirror 14 is a concave surface mirror. However, an intermediate optical system 18 is constituted by a single plane surface mirror 42 reflecting a fundamental wave and transmitting a higher harmonic wave such as, for example, a double frequency wave and an intermediate concave surface mirror 44 reflecting a beam reflected from the plane surface mirror 42 to a second resonator mirror 14 and reflecting a beam reflected from the second resonator mirror 14 to the plane surface mirror 42.

With this structure, the individual constituent elements are arranged such that a laser beam is a parallel beam while it is proceeding along a light route passing through a first resonator mirror 12, a laser medium 16, the plane surface mirror 42 and the intermediate concave surface mirror 44 but is converged once and then diverged between the intermediate concave surface mirror 44 and the second resonator mirror 14.

In this example of structure, a nonlinear optical crystal 20 is inserted at the beam waist position of the light route between the intermediate concave surface mirror 44 and the second resonator mirror 14.

This embodiment is substantially the same as the first embodiment except for that the intermediate optical system 18 is not constituted by any single plane surface mirror but is constituted by the plane surface mirror 42 and the intermediate concave surface mirror 44. With this embodiment, it is thus possible to obtain a separate effect from the effects discussed above obtainable with the first embodiment, i.e., an effect that a secondary harmonic wave, i.e., a double frequency laser beam output from the plane surface mirror 42 has spread angle as small as 2 mrad (i.e., is substantially a parallel beam).

THIRD EMBODIMENT

This embodiment is a modification of the second embodiment, and will be described with reference to FIG. 4.

Where a laser beam converged by a concave surface mirror or the like is wavelength converted in a nonlinear optical crystal, not only a beam waist or a laser beam but also a beam size over the entire length of the crystal is important. The optimum beam size varies depending on the laser output as well. Where the laser output is varied, disposition of the concave surface mirror at a fixed position poses problems in view of performance such as stability. This is particularly important in cases where the heat-lens effect of a rod such as a solid laser is varied. Further, if it is intended to reduce the beam spot when the fundamental wave output is high, the nonlinear optical crystal is liable to be damaged.

In the above second embodiment, the above-mentioned problems are liable to be posed because the individual mirrors are disposed at fixed positions. Accordingly, in the third embodiment of the laser apparatus a second resonator mirror 14 is made capable of position control along the optical axis of a laser apparatus.

In this embodiment, the second resonator mirror 14 is supported by a fine position control mechanism 50 having a suitable, well-known structure, such that its position can be finely controlled by causing its fine displacement along an optical axis with a fine displacement screw or like fine displacement means. A nonlinear optical crystal 20 also is suitably capable of being inserted in the optical path between two concave surface mirrors 14 and 44 in a state supported by a support mechanism 60 which is capable of fine displacement for fine position control of the crystal along the optical axis. Alternatively, the nonlinear optical crystal 20 may be supported by a support mechanism incapable of fine displacement in the optical axis direction, and it may be inserted in the optical path at the beam waist position every time the position control of second resonator mirror 14 is made.

With this arrangement, by causing displacement of the second resonator mirror 14 along the optical axis, the distance between first and second resonator mirrors 12 and 14 may be varied to vary the shape of convergence of the laser beam in the crystal 20. Efficient wavelength conversion thus can be obtained over the entire length of the crystal by displacing the second resonator mirror 14 along the optical axis. In addition, the spread angle of the laser beam provided from the plane surface mirror may also be varied by displacing the second resonator mirror 14. The spread angle range may be set to a value within about 2 to about 10 mrad.

With the structure of the third embodiment, in which the second resonator mirror can be displaced along the optical axis, in addition to obtaining the effects obtainable with the first embodiment, efficient wavelength conversion can be obtained over the entire length of nonlinear optical crystal 20. Further, it is possible to set not only the shape of the beam in the crystal but also the spread angle of the output laser beam from plane surface mirror 42. Still further, in case of a high output laser apparatus it is possible to increase the beam waist to prevent damage to the crystal. It is thus possible to set an optimum output position and vary the output.

Figure 4:
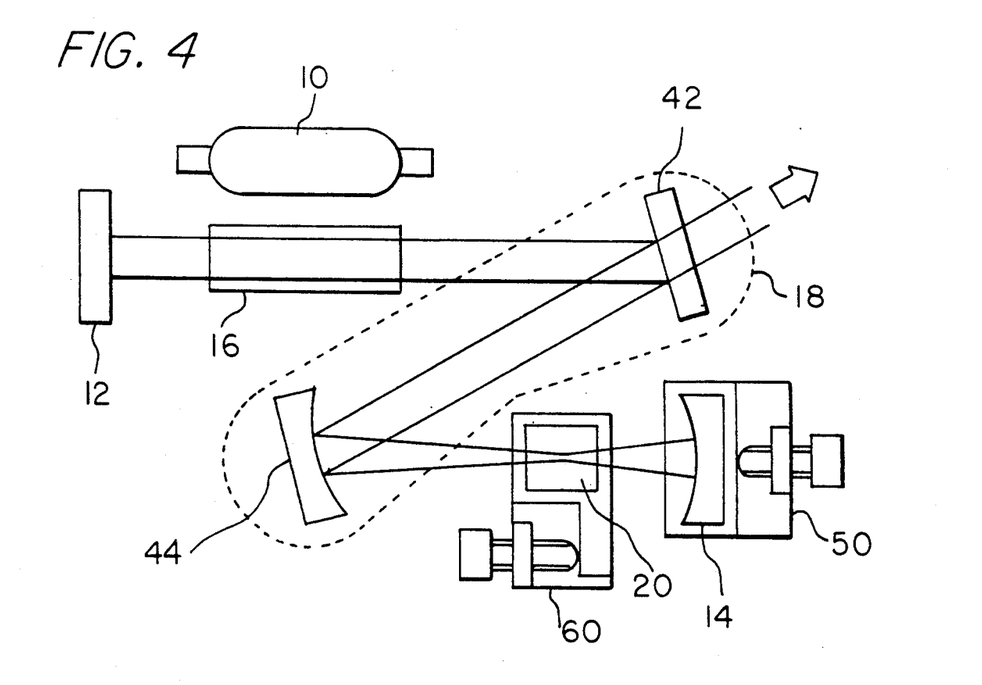
FIG. 4 is a schematic view showing a third embodiment the laser apparatus according to the invention.

In the second structure of the laser apparatus shown in FIGS. 3 and 4 corresponding to the second and third embodiment as well as the first structure of laser apparatus shown in FIG. 2 corresponding to the first embodiment, there are optimum value ranges of inter-element distances, reflection angles, radii curvature of mirrors and so forth for providing an increased laser output depending on the ways of setting the parameters noted above.

Experiments and analytical calculation were conducted with respect to the first and second structure examples (of FIGS. 2 and 3), and it has been found that the optimum values are substantially determined by the following conditions although they vary depending on the dimensions of the laser medium, dimensions of the nonlinear optical crystal and excitation source. The following designations concern FIGS. 2 and 3.

$L_1$: The spacial distance between a first resonator mirror 12 and a laser medium 16, $L_2$: The spacial distance between a concave surface mirror 18 of a intermediate optical system and a laser medium 16, $L_3$: The spacial distance between a concave surface mirror 18 of a intermediate concave surface mirror 18 and a laser beam convergence position (i.e., beam waist) in a nonlinear optical crystal 20, $L_4$: The spacial distance between a concave surface mirror 14 as a second resonator mirror and the laser beam convergence position (i.e., beam waist) in the nonlinear optical crystal 20, $L_5$: The spacial distance between a plane surface mirror 42 of the intermediate optical system 18 and the laser medium 16, $L_6$: The spacial distance between a plane surface mirror 42 of the intermediate optical system 18 and an intermediate concave mirror 44, $R_1$: The radius of curvature of the first resonator mirror 12, $R_2$: The radius of curvature of the concave surface mirror 18 of the intermediate optical system or the intermediate concave surface mirror 44 of the intermediate optical system, $R_3$: The radius of curvature of the concave surface mirror 14, $R_4$: The radius of curvature of the plane surface mirror 42, $\theta_1$: The angle (in degrees) between incident and reflected beams on and from the concave surface mirror 18 or the intermediate concave surface mirror 44, and $\theta_2$: The angle (in degrees) between the incident and reflected beams on and from the plane surface mirror 42.

In the first structure of laser apparatus shown in FIG. 2, the optimum conditions are $$0.5 \times (L_2+L_3+L_4) \leq L_1 \leq 1.5 \times (L_2+L_3+L_4).$$

In the second structure of laser apparatus shown in FIG. 2, they are $$0.5 \times (L_3+L_4+L_5+L_6) \leq L_1 \leq 1.5 \times (L_3+L_4+L_5+L_6).$$

By setting the $L_1$ to be in the ranges of the g optimum conditions in the first and second structures of laser apparatus, the laser output may be increased to the maximum or a value near the maximum. If the $L_1$ is out of the ranges, it is liable that the laser output is extremely reduced or the oscillation is stopped.

Further, by setting the $L_3$ and $L_4$ to meet conditions $$0.3 \times R_2 \leq L_3 \leq 0.7 \times R_2, \text{ and}$$

$$0.8 \times R_3 \leq L_4 \leq 1.2 \times R_3;$$

the laser beam may be converged to a very small spot in the nonlinear optical crystal. Thus, the efficiency of wavelength conversion may be increased, and the maximum output can be obtained more reliably.

Examples of numerical values of the parameters concerning the elements of the first and second structures of laser apparatus used in the experiments are as follows.

Length of the laser medium: 75 mm,
Length of the nonlinear optical crystal: 5 mm,
$L_1$: 160 mm: $R_1$: $\alpha$,
$L_2$: 80 mm $R_2$: 120 mm,
$L_3$: 60 mm $R_3$: 30 mm,
$L_4$: 30 mm $R_4$: $\alpha$,
$L_5$: 50 mm $\theta_1$: 10°, and
$L_6$: 30 mm $\theta_2$: 45°.

Under these conditions, the outputs of the first and second structures of the laser apparatus were about 1.5 W with a secondary harmonic wave, i.e., a double frequency wave wavelength of 532 nm as noted before.

It will be obvious to a person having ordinary knowledge in the art that the above embodiments are by no means limitative.

For example, while the above embodiments concern YAG lasers, the invention is applicable to other lasers as well. Further, while the above embodiments are described in conjunction with only the basic structure, there are no limitations on other necessary portions of the structure as laser apparatus. Still further, there are no limitations on other items of the shape, size, material, etc. of the concave surface mirrors than those described.

As has been described in the foregoing, with the structure of laser apparatus, in which the intermediate optical system is formed as a concave surface mirror and serves as an output mirror, it is possible to obtain a high output of laser through conversion of the fundamental wave to the double frequency wave of laser beam with high efficiency.

Further, with the laser apparatus, in which the intermediate optical system is formed with a plane surface mirror serving as an output mirror and an intermediate concave surface mirror, it is possible to obtain a high output through wavelength conversion with high efficiency and also obtain a small spread angle of the output laser beam and hence a substantially parallel laser beam.

Further, with the laser apparatus structure, in which the second resonator mirror can be displaced along the optical axis, it is possible to permit variations of the diameter, position and shape of the beam waist. Besides, the output power and spread angle of the output laser beam may be varied. It is thus possible to obtain optimum or g desired output characteristics. Further, where the nonlinear optical crystal is inserted in the optical path, it is possible to vary the optimum position or optimum output for obtaining the optimum output laser beam.

Now, an embodiment of the cooling structure for a pumping source lamp of a laser apparatus according to the present invention will be described with reference to the drawings.

Figure 6:
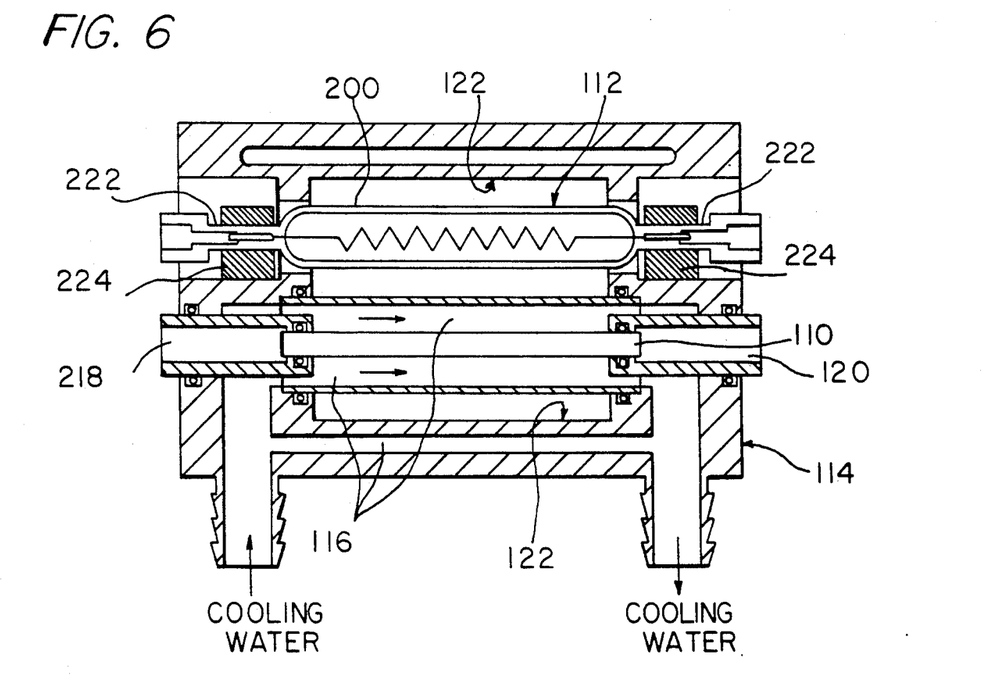
FIG. 6 is a schematic sectional view showing an essential part of a laser apparatus for explaining a cooling structure for an excitation source lamp of a laser apparatus according to the invention.

FIG. 6 is a sectional view showing a typical example of a laser apparatus provided with a lamp cooling structure for explaining one embodiment of the present invention. In FIG. 6, the shape, size and dispositional relation of individual constituent elements are shown only schematically to such an extent that the invention can be understood.

Referring to FIG. 6, a laser apparatus includes as main constituent elements a laser medium 110, a pumping source lamp 112 for pumping or exciting a medium and resonator mirrors (not shown). In this embodiment, the laser medium 110 is a YAG laser rod, and the medium 110 and the lamp 112 are supported by a holding block 114, which can be disassembled and reassembled. Further, as in the prior art the block is formed with cooling water passages 116 for the water cooling laser medium 110, and light paths or routes 110 and 120 through which a laser beam generated from the laser medium 110 can traverse. Also, as in the prior art the block has an inner space, in which the laser medium 110 and the lamp 112 face each other at a fixed distance from each other. Inner wall surfaces of the block defining the inner space are mirror surfaces so that pumping light of the lamp 112 can efficiently be converged on and pump or excite the laser medium 110.

In this embodiment, the lamp 112 is a tungsten-halogen lamp, and a bulb 220 and seal portions 222 of the lamp 112 and walls of a portion of holding block 114 are used for light isolation, i.e., preventing leakage of light to the outside, and also for heat shielding. The seal portions 222 are provided with heat radiation portions 224 for radiating heat of the seal portions 222 to the outside of the holding block. Preferably, the heat radiation portions 224 are provided in contact with part of the walls of the holding block 114, as illustrated in the figure. Particularly, where the holding block 114 is provided with a cooling water passage 116 for cooling the laser medium 110 as in this embodiment, by providing the heat radiation portions 224 in contact with the holding block 114 for holding the laser medium, a great cooling effect can be obtained.

The status of the heat radiation portions 224 may be suitably determined according to the design. For example, they may wrap or sandwich the periphery of the seal portions 222, or they may be in contact with one side surface of seal portions 222. Further, their shape may be suitably selected. For example, they may have a block-like shape of a shape having a plurality of fins or any other shape.

Heat radiation portions 224 are suitably made of a metal having high heat conductivity, but they may be made of materials other than metals as well. Further, the contact of the heat radiation portions 224 and the seal portions 222 or the holding block may be attained either directly or by application of an adhesive having good heat conductivity.

In the cooling structure for cooling a lamp according to the present invention, heat radiation portions 224 are in contact with seal portions 222 for obtaining efficient heat radiation from these portions. Thus, heat in the bulb 220 of the lamp 112 is not radiated through the heat radiation portions 224. Thus it is possible to obtain cooling of the seal portions 222 to a temperature below 200° C., preferably below 100° C., while the bulb 220 or the lamp 112 is at a high temperature of 250° C. or above. Thus there is no possibility of thermal rupture of the seal portions 222, and the life of the lamp which has heretofore been about 10 hours can be extended to several 1,000 hours.

As has been described in the foregoing, the cooling structure for a pumping source lamp for a laser apparatus is provided with heat radiation portions which can effectively cool only seal portions. Thus, there is no possibility that the seal portions are at a temperature comparable to or near the bulb temperature of the lamp, and it is possible to avoid thermal rupture of the seal portions. The life of the lamp thus can be extremely extended compared to the prior art lamp. In addition, the lamp can be used as a high power lamp, and it is possible to obtain a high output laser beam.

What is claimed is:

1. A laser apparatus comprising:
   an optical pumping source;
   first and second resonator mirrors;
   a laser medium provided on a light route between said first and second mirrors;
   an optical system provided in a light route between said laser medium and said second resonator mirror; and
   a nonlinear optical crystal for generating through wavelength conversion at least one higher harmonic wave from a fundamental wave of laser generated by said laser medium;
   wherein said nonlinear optical crystal is inserted between said optical system and said second resonator mirror;
   wherein said second resonator mirror is a concave mirror; and
   wherein said optical system comprises a concave mirror reflecting the fundamental wave and transmitting the higher harmonic wave.

2. The laser apparatus according to claim 1, wherein $$0.5 \times (L_2 + L_3 + L_4) \leq L_1 \leq 1.5 \times (L_2 + L_3 + L_4);$$

where
   $L_1$ is a distance between said first resonator mirror and said laser medium,
   $L_2$ is a distance between said concave mirror of said optical system and said laser medium,
   $L_3$ is a distance between said concave mirror of said optical system and a laser beam convergence position in said nonlinear optical crystal, and
   $L_4$ is a distance between said second resonator concave mirror and the laser beam convergence position in said nonlinear optical system.

3. The laser apparatus according to claim 1, wherein $$0.3 \times R_2 \leq L_3 \leq 0.7 \times R_2, \text{ and}$$

$$0.8 \times R_3 \leq L_4 \leq 1.2 \times R_3;$$

where
   $L_3$ is a distance between said concave mirror of said optical system and a laser beam convergence position in said nonlinear optical crystal,
   $L_4$ is a distance between said second resonator concave mirror and the laser beam convergence position in said nonlinear optical system, $R_2$ is a radius curvature of said concave mirror of said optical system, and $R_3$ is a radius of curvature of said second resonator concave mirror.

4. A laser apparatus comprising:
an optical pumping source;
first and second resonator mirrors;
a laser medium provided on a light route between said first and second resonator mirrors;
an optical system provided in a light route between said laser medium and said second resonator mirror; and
a nonlinear optical crystal for generating through wavelength conversion at least one higher harmonic wave from a fundamental wave of laser generated by said laser medium;
wherein said nonlinear optical crystal is inserted between said optical system and said second resonator mirror;
wherein said second resonator mirror is a concave mirror;
wherein said optical system comprises a plane mirror reflecting the fundamental wave and transmitting the higher harmonic wave, and an intermediate concave mirror reflecting light reflected from said plane mirror to said second resonator mirror and reflecting light reflected from said second resonator mirror to said plane mirror.

5. The laser apparatus according to claim 4, wherein said second resonator mirror is position controllable along an optical axis of the laser apparatus.

6. The laser apparatus according to claim 4, wherein $$0.5 \times (L_3 + L_4 + L_5 + L_6) \leq L_1 \leq 1.5 (L_3 + L_4 + L_5 + L_6);$$

where
$L_1$ is a distance between said first resonator mirror and said laser medium,
$L_3$ is a distance between said concave mirror of said optical system and a laser beam convergence position in said nonlinear optical crystal,
$L_4$ is a distance between said second resonator concave mirror and a laser beam convergence position in said nonlinear optical crystal,
$L_5$ is a distance between said plane mirror of said optical system and said laser medium, and
$L_6$ is a distance between said plane mirror of said optical system and said intermediate concave.

7. The laser apparatus according to claim 4, wherein $$0.3 \times R_2 \leq L_3 \leq 0.7 \times R_2, \text{ and}$$

$$0.8 \times R_3 \leq L_4 \leq 1.2 \times R_3;$$

where
$L_3$ is a distance between said concave mirror of said optical system and a laser beam convergence position in said nonlinear optical crystal,
$L_4$ is a distance between said second resonator concave mirror and the laser beam convergence position in said nonlinear optical crystal,
$R_2$ is a radius of curvature of said concave mirror of said optical crystal, and
$R_3$ is a radius of curvature of said second resonator concave mirror.

* * * * *

UNITED STATES PATENT AND TRADEMARK OFFICE
CERTIFICATE OF CORRECTION

PATENT NO. : 5,177,751
DATED : January 5, 1993
INVENTOR(S) : Kuniaki Kobayashi, et al.

It is certified that error appears in the above-identified patent and that said Letters Patent is hereby corrected as shown below:

Column 6, line 23, before "the" (first occurrence) insert --of--.

Column 7, line 37, after "described" insert --.--.

Column 8, line 4, after "has" insert --a--.

Column 10, line 66, after "or" delete --g--.

Column 11, line 54, change "of a" to --or a--.

Signed and Sealed this

Nineteenth Day of October, 1993

BRUCE LEHMAN

*Attest:*

*Attesting Officer*   *Commissioner of Patents and Trademarks*